United States Patent
Noh et al.

(10) Patent No.: US 10,133,930 B2
(45) Date of Patent: Nov. 20, 2018

(54) ROBOT CLEANER AND METHOD FOR CONTROLLING THE SAME

(71) Applicant: LG ELECTRONICS INC., Seoul (KR)

(72) Inventors: Dongki Noh, Seoul (KR); Yeonsoo Kim, Seoul (KR); Seungmin Baek, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/882,090

(22) Filed: Oct. 13, 2015

(65) Prior Publication Data

US 2016/0104044 A1  Apr. 14, 2016

(30) Foreign Application Priority Data

Oct. 14, 2014  (KR) .................. 10-2014-0138555

(51) Int. Cl.
*G06K 9/00* (2006.01)
*G06K 9/46* (2006.01)
(Continued)

(52) U.S. Cl.
CPC ........ *G06K 9/00664* (2013.01); *B25J 9/1664* (2013.01); *B25J 9/1676* (2013.01); (Continued)

(58) Field of Classification Search
None
See application file for complete search history.

(56) References Cited

U.S. PATENT DOCUMENTS

| 4,954,962 A * | 9/1990 | Evans, Jr. ............. G01C 21/00 180/169 |
| 9,440,355 B2 * | 9/2016 | Noh ..................... G05D 1/024 |

(Continued)

FOREIGN PATENT DOCUMENTS

| EP | 2 677 386 A1 | 12/2013 |
| KR | 10-0638220 B1 | 10/2006 |

(Continued)

OTHER PUBLICATIONS

Korean Notice of Allowance dated Feb. 29, 2016 issued in Application No. 10-2014-0138555.

(Continued)

*Primary Examiner* — Nancy Bitar
(74) *Attorney, Agent, or Firm* — KED & Associates LLP

(57) ABSTRACT

A method for controlling a robot cleaner configured to project light of a predetermined pattern to a floor of an area in front thereof in a specific direction and to acquire an image of the area to which the light is projected, according to the present disclosure, includes: (a) acquiring a front view image of the robot cleaner; (b) detecting the pattern from the image acquired in (a); and (c) discriminating a pattern formed by reflected light from a pattern formed by light directly projected from the robot cleaner, from among patterns indicated in the acquired image, on the basis of geometrical characteristics defined by a projection direction of the light and the direction of an optical axis in which the image is acquired when two or more patterns are detected from the image.

14 Claims, 11 Drawing Sheets

(51) Int. Cl.
*B25J 9/16* (2006.01)
*G05D 1/02* (2006.01)
*G06T 7/73* (2017.01)
*G06T 7/521* (2017.01)

(52) U.S. Cl.
CPC .......... *B25J 9/1697* (2013.01); *G05D 1/0248* (2013.01); *G06K 9/4661* (2013.01); *G06T 7/521* (2017.01); *G06T 7/74* (2017.01); *G05D 2201/0203* (2013.01); *Y10S 901/01* (2013.01)

(56) References Cited

U.S. PATENT DOCUMENTS

| | | | |
|---|---|---|---|
| 9,511,494 B2* | 12/2016 | Noh | B25J 9/1676 |
| 2005/0027399 A1 | 2/2005 | Koh et al. | |
| 2006/0041333 A1* | 2/2006 | Anezaki | G06K 9/00201 |
| | | | 700/259 |
| 2007/0100498 A1* | 5/2007 | Matsumoto | G05D 1/024 |
| | | | 700/245 |
| 2010/0053565 A1* | 3/2010 | Mizushima | G02B 3/0006 |
| | | | 353/38 |
| 2010/0070125 A1* | 3/2010 | Lee | G06T 7/0042 |
| | | | 701/28 |
| 2013/0088575 A1 | 4/2013 | Park et al. | |
| 2013/0338831 A1* | 12/2013 | Noh | B25J 9/1676 |
| | | | 700/259 |
| 2014/0085621 A1 | 3/2014 | Lee et al. | |
| 2017/0008169 A1* | 1/2017 | Kitamura | G01B 11/2513 |

FOREIGN PATENT DOCUMENTS

| | | |
|---|---|---|
| KR | 10-2013-0141979 A | 12/2013 |
| WO | WO 2011/146259 A2 | 11/2011 |

OTHER PUBLICATIONS

European Search Report dated Mar. 16, 2016 issued in Application No. 15189286.6.

* cited by examiner (a)

(b)

ROBOT CLEANER AND METHOD FOR CONTROLLING THE SAME

CROSS-REFERENCE TO RELATED APPLICATION

This application claims priority under 35 U.S.C. § 119 to Korean Patent Application No. 10-2014-0138555, filed on Oct. 14, 2014 in the Korean Intellectual Property Office, whose entire disclosure is hereby incorporated by reference.

BACKGROUND

1. Field

The present disclosure relates to a robot cleaner and a method for controlling the same.

2. Background

A robot has been developed for industrial purposes and served as part of factory automation. With the recent extension of robot application fields, e.g., medical robots, space and aircraft robots, etc., home robots are being developed and manufactured. A robot which can autonomously move is called a mobile robot.

A typical example of home mobile robots is a robot cleaner. The robot cleaner is a type of home appliance, which sucks in dust or particles while moving about an area to be cleaned. Such robot cleaner includes a pattern projection unit for projecting light in a predetermined pattern toward a floor of an area in front of the main body of the robot cleaner, and a camera for photographing the area to which the light is projected. The state of a cleaning area (e.g., the position of the floor, obstacles around the robot cleaner, the boundary between the floor and an obstacle and the like) can be recognized by analyzing a light pattern appearing in an image obtained through the camera.

Since some materials of floors or objects to which light is projected reflect the light, a new light pattern due to reflection can be detected in addition to the original light pattern. In this case, the pattern generated due to reflection of light needs to be eliminated in analysis of the state of the cleaning area. Accordingly, there is a need to devise a method for discriminating an unnecessary light pattern, e.g., a light pattern generated due to reflection of light, from light patterns detected from an image.

BRIEF DESCRIPTION OF THE DRAWINGS

The embodiments will be described in detail with reference to the following drawings in which like reference numerals refer to like elements wherein.

DETAILED DESCRIPTION

Figure 1:
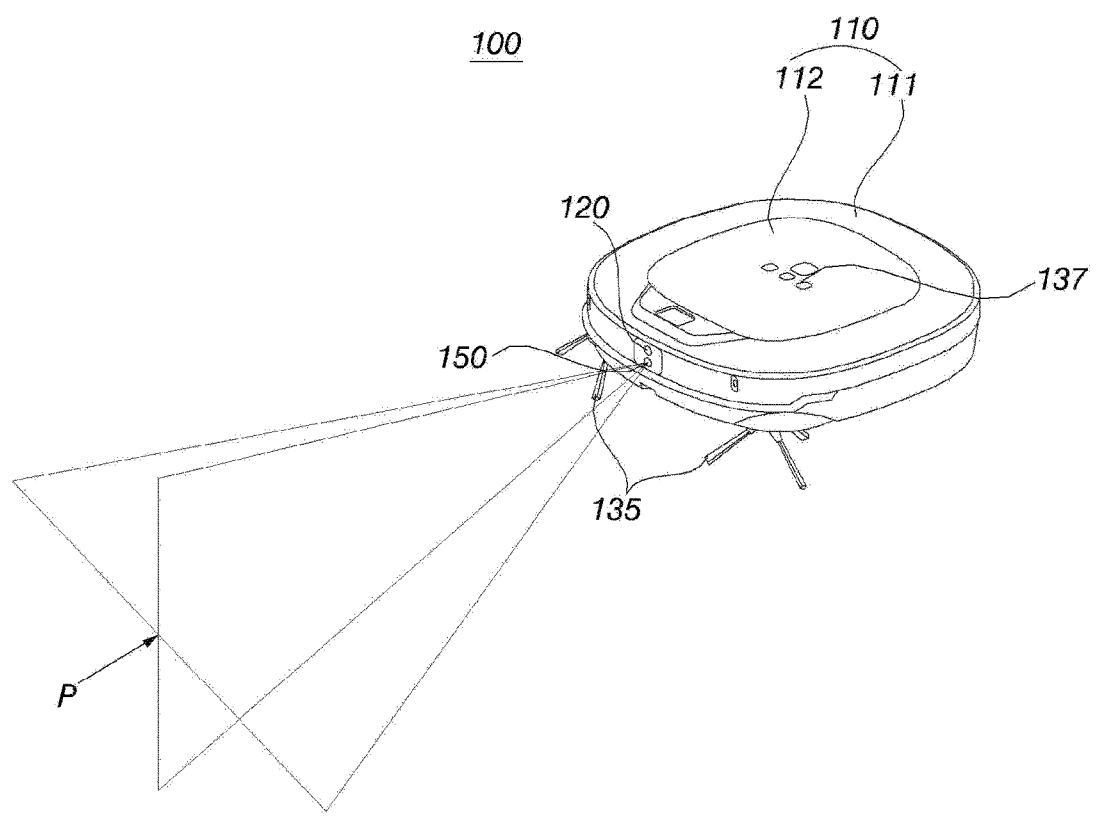
FIG. 1 is a perspective view of a robot cleaner according to an embodiment of the present disclosure.
Figure 2:
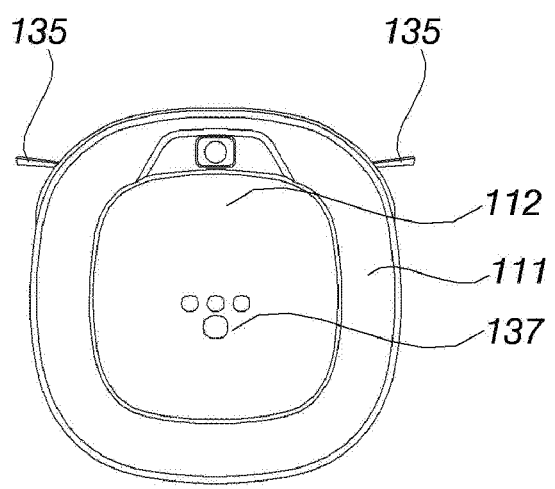
FIG. 2 is a top view of the robot cleaner shown in FIG. 1.
Figure 3:
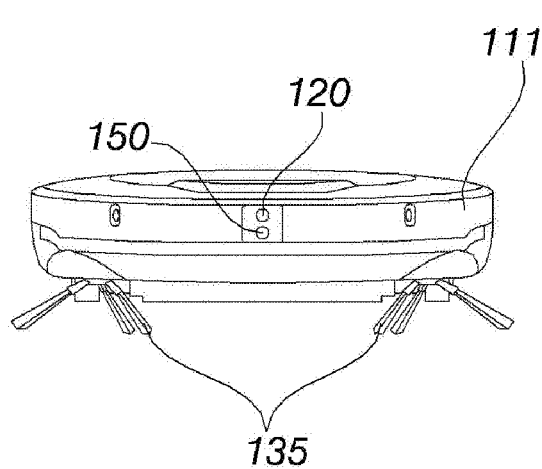
FIG. 3 is a front view of the robot cleaner shown in FIG. 1.
Figure 4:
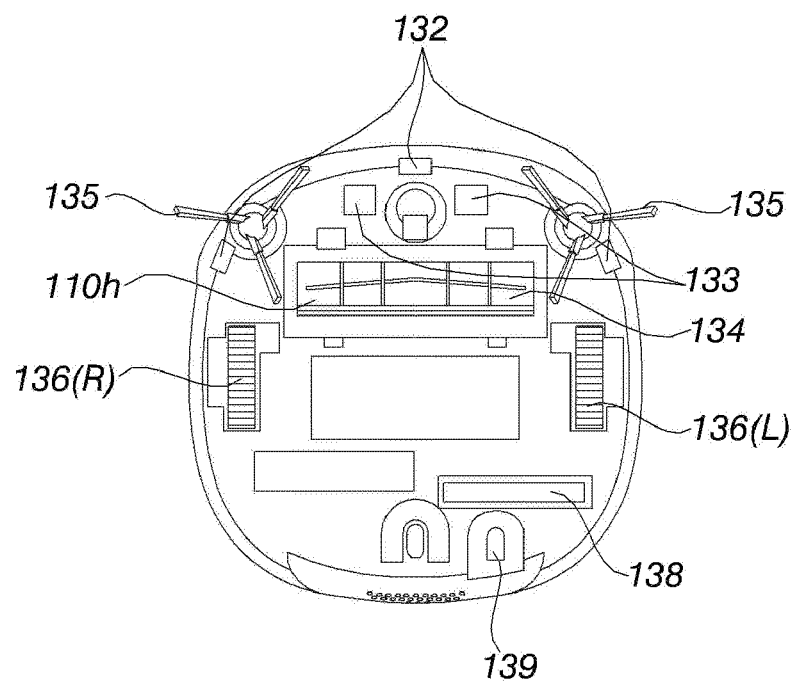
FIG. 4 is a bottom view of the robot cleaner shown in FIG. 1.
Figure 5:
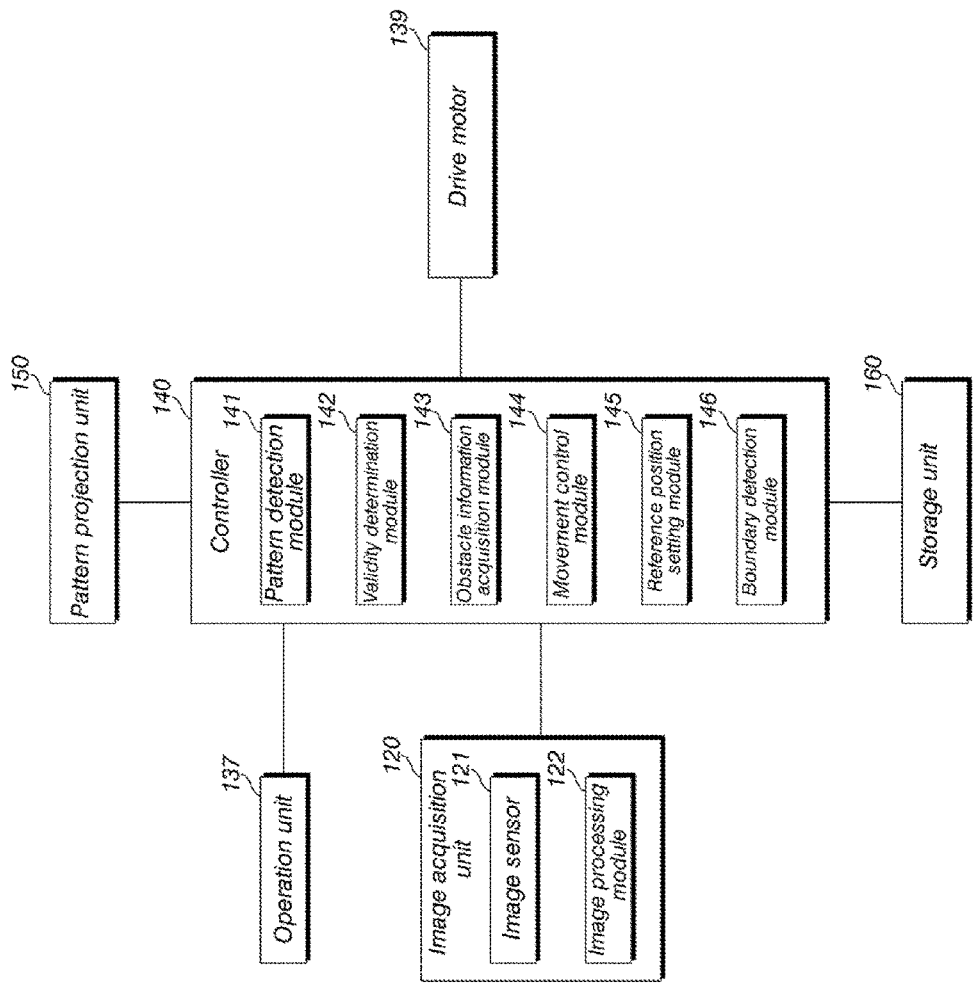
FIG. 5 is a block diagram illustrating a control relationship between main parts of the robot cleaner.

Referring to FIGS. 1 to 5, a robot cleaner 100 may include a main body 110 and an image acquisition unit or camera 120 for acquiring an image around the main body 110. A part of the main body 110, which faces the ceiling of a cleaning area, is defined as an upper surface part or upper (refer to FIG. 2), a part facing the floor of the cleaning area is defined as a lower surface part or lower (refer to FIG. 4), and a part facing a moving direction, from among parts forming the circumference of the main body 110 between the upper surface part and the lower surface part, is defined as a front part or front (refer to FIG. 3).

The robot cleaner 100 includes at least one wheel 136 for moving the main body 110, and the wheel 136 is driven by a drive motor 139. The wheel 136 can be provided to the left and right sides of the main body 110, which are respectively called a left wheel 136(L) and a right wheel 136(R).

While the left wheel 136(L) and the right wheel 136(R) can be driven by one drive motor, a separate left wheel drive motor for driving the left wheel 136(L) and a separate right wheel drive motor for driving the right wheel 136(R) may be provided. The moving direction of the main body 110 can be changed to the left or right based on a difference between rotating speeds of the left wheel 136(L) and the right wheel 136(R).

The lower surface part of the main body 110 may have an inlet 110h for air intake. The main body 110 may include a suction device or suction motor for providing power for sucking in air through the inlet 110h and a dust container for collecting dust contained in the air sucked through the inlet 110h.

The main body 110 may include a case 111 forming a space for accommodating components of the robot cleaner 100. The case 111 may have an opening through which the dust container is inserted into or separated from the main body 110, and a dust container cover 112 for rotatably opening/closing the opening may be provided to the case 111.

The robot cleaner 100 may include a roll type or roller main brush 134 having brushes exposed through the inlet 110h and auxiliary brushes 135 provided to the front of the lower surface part. The auxiliary brushes 135 include a plurality of radially extended blades. Dust is removed from the floor within the cleaning area according to rotation of the brushes 134 and 135, sucked through the inlet 110*h* and collected in the dust container.

A battery 138 supplies power necessary for operation of the robot cleaner 100 as well as the drive motor. When the battery 138 is discharged, the robot cleaner 100 can return to a charging stand for charging. When retuning to the charging stand, the robot cleaner 100 can detect the location of the charging stand.

A pattern projection unit 150 projects light in a predetermined pattern (referred to as "patterned light" hereinafter) to the cleaning area. The pattern projection unit 150 may include a light source and an optical pattern projection element (OPPE). Light emitted from the light source generates the patterned light by passing through the OPPE. The light source may be a laser diode (LD), a light emitting diode (LED) and the like.

A laser beam enables accurate distance measurement due to monochromaticity, collimation and focusing characteristics superior to other light sources. Infrared or visible light has large distance measurement accuracy variation depending on factors such as the color and material of a target. Accordingly, the light source is generally a laser diode. The OPPE may include a lens and a diffractive optical element (DOE).

The pattern projection unit 150 may project light toward the floor in front of the main body 110. The pattern of the light projected from the pattern projection unit 150 is not limited to a specific pattern and may include the horizontal line. While a pattern including the horizontal line PL is exemplified in the present embodiment, a cross-shaped pattern further including a vertical line perpendicular to the horizontal line PL may be used.

The image acquisition unit 120 acquires an image by photographing an area to which the patterned light is projected. The image acquired by the image acquisition unit 120 is referred to as an acquired image. The image acquisition unit 120 may include a digital camera which converts an image of an object into an electrical signal, changes the electrical signal into a digital signal and stores the digital signal in a memory element or storage medium. The digital camera may include an image sensor 121 and an image processing module 122.

The image sensor 121, which is a device for converting an optical image into an electrical signal, is configured in the form of a chip in which a plurality of photodiodes is integrated. The photodiodes may correspond to pixels. Charges are accumulated in the pixels according to an image formed in the chip by light that has passed through the lens, and the charges accumulated in the pixels are converted into an electrical signal (e.g. voltage). Examples of the image sensor 121 include a charge coupled device (CCD), a complementary metal oxide semiconductor (CMOS) and the like.

The image processing module 122 generates a digital image on the basis of an analog signal output from the image sensor 121. The image processing module 122 may include an AD converter for converting the analog signal into a digital signal, a buffer memory for temporarily storing digital data according to the digital signal output from the AD converter, and a digital signal processor (DSP) for generating a digital image by processing information stored in the buffer memory.

A storage unit or memory 160 stores information necessary to control the robot cleaner and may include a volatile or non-volatile recording medium. The recording medium stores data readable by a microprocessor and may include a hard disk drive (HDD), a solid state disk (SSD), a silicon disk drive (SDD), a ROM, a RAM, a CD-ROM, a magnetic tape, a floppy disk, an optical data storage device and the like.

A controller 140 performs feature detection on predetermined pixels in an image (acquired image) obtained by the image acquisition unit 120 so as to detect a segment formed by consecutive feature pixels according to a feature detection result. The controller 140 may include a pattern detection module 141 for detecting a light pattern (generated according to patterned light projected from the pattern projection unit 150) indicated in the acquired image, and a validity determination module 142 for checking validity of detected patterns. Validity check refers to an operation of discriminating a valid pattern (a pattern generated by light directly projected onto the surface of an object from the pattern projection unit 150, which is referred to as a valid pattern hereinafter) and/or a pattern generated by reflected light (a pattern generated by light projected from the pattern projection unit 150 and then reflected by the surface of the object, which is referred to as a pattern according to reflected light hereinafter) from among patterns detected by the pattern detection module 141.

The direction in which light is projected from the pattern projection unit 150 and the direction (or view) of the camera constituting the image acquisition unit 150 are information that can be obtained, and validity check is performed according to the principle of discrimination of a valid pattern from a pattern according to reflected light through geometrical analysis using such information.

When light is projected to a floor from the pattern projection unit 150, a position (referred to as a reference position hereinafter) at which a pattern is indicated in an acquired image is determined on the basis of the direction in which the patterned light is projected from the pattern projection unit 150 and the direction of the optical axis (e.g., the center axis of a camera lens) of the image acquisition unit 120. The reference position is an important criterion of discrimination of a valid pattern from a pattern according to reflected light in validity check, and the relative position of the valid pattern with respect to the reference position is used as important information in three-dimensional reconfiguration (refer to step S15 of FIG. 10) of obstacles around the robot cleaner 100.

Figure 9:
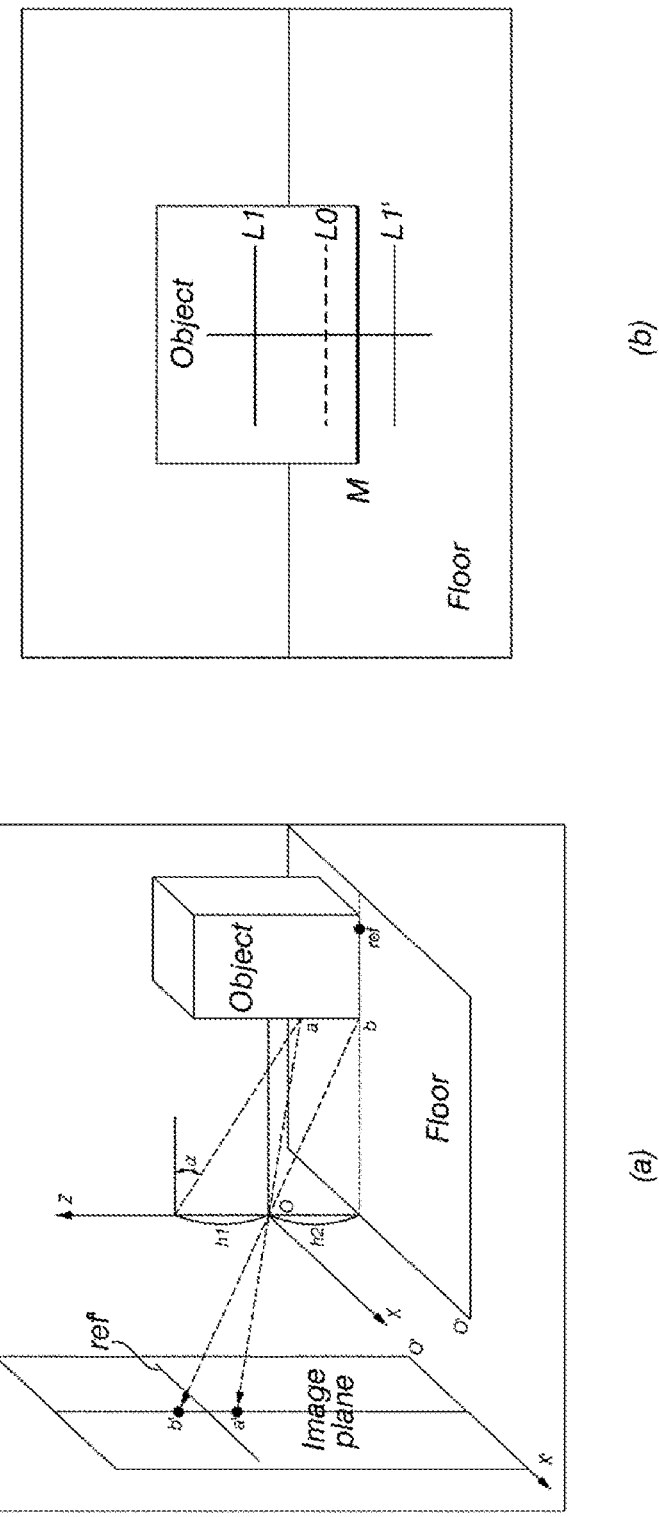
FIG. 9 is a schematic diagram illustrating optical geometry wherein an image is formed by an image sensor when an object is located within a projection range of a pattern projection unit 150 as shown in (a) and (b) shows an image acquired in the case of (a)

In the figures, the direction in which the patterned light is projected from the pattern projection unit 150 is at an angle α to the horizontal (refer to FIG. 9(*a*)) and the direction β of the optical axis of the image acquisition unit 120 is assumed to be horizontal. When the image acquisition unit 150 and the pattern projection unit 150 are fixed to the main body 100 as in the embodiment, the aforementioned angles have fixed values.

However, even when the image acquisition unit 120 and/or the pattern projection unit 150 are provided such that position change (e.g., vertical movement or horizontal movement) or posture change (e.g., X-axis rotation, Y-axis rotation or Z-axis rotation on the basis of XYZ coordinates) thereof is possible, a factor (e.g., displacement or rotation angle) which defines the positions or postures of the image acquisition unit 120 and/or the pattern projection unit 150 during acquisition of an image can be detected and thus the reference position in the acquired image can be defined. The robot cleaner 100 may further include a cliff sensor 132 for sensing presence of a cliff within the cleaning area, a lower camera sensor 139 for acquiring an image of the floor and a charging terminal 133 for charging the battery 138.

Figure 6:
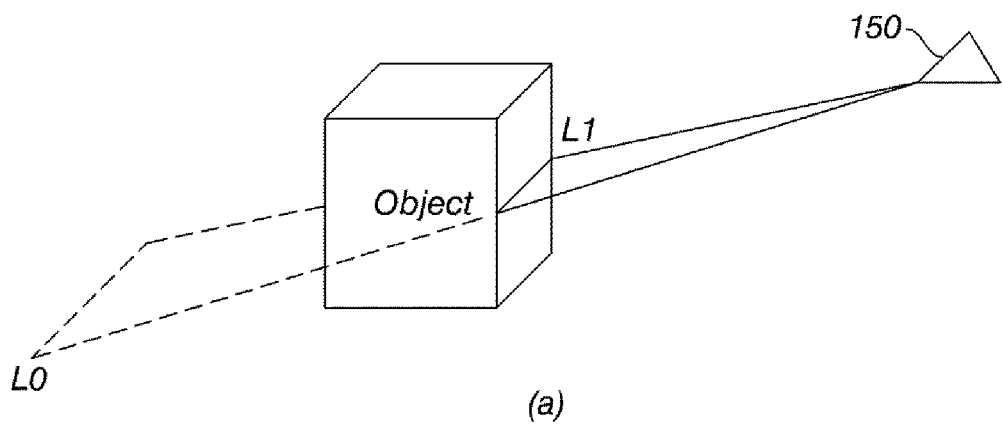
FIG. 6 is a schematic diagram illustrating projection of light to an object from a pattern projection unit as shown in (a) and (b) shows an image acquired according to the projection of light.
Figure 6:
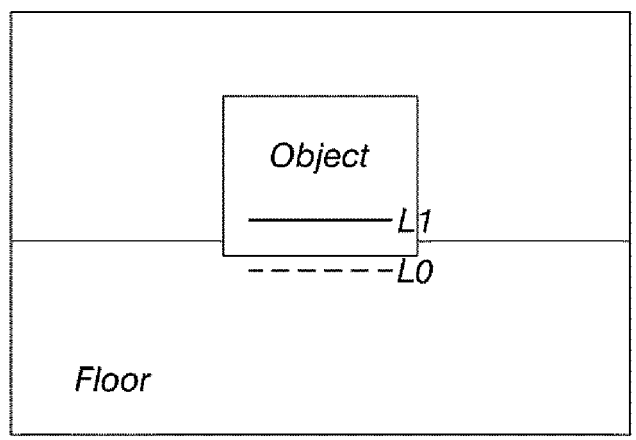

FIG. 6(a) is a schematic diagram illustrating projection of light to an object from the pattern projection unit and FIG. 6(b) shows an image acquired according to the projection of light. Referring to FIG. 6(a), when light is projected from the pattern projection unit 150 toward an object, the light forms a pattern on the surface of the object instead of arriving at the floor. In the figure, L0 indicates the position of a pattern formed when the light is projected to the floor and L1 indicates a pattern formed on the object when the object is located within a patterned light projection range. L0 and L1 represent in the same in other figures.

As illustrated by the acquired image shown in FIG. 6(b), when the object is located within the projection range of the pattern projection unit 150, the valid pattern L1 located above the reference position L0 is detected from the acquired image. The controller 140 may include an obstacle information acquisition module 143 for acquiring information about an obstacle in front of the robot cleaner on the basis of the valid pattern L1 detected from the acquired image. In this case, the obstacle information acquisition module 143 can acquire obstacle information such as an object distribution state and a distance to the object (or the depth of the object in the image) on the basis of a location relation between the valid pattern L1 and the reference position L0 in the acquired image. For example, it is possible to determine that the object is located closer to the robot cleaner 100 in the real space as the distance between the valid pattern L1 and the reference position L0 increases in the acquired image.

FIG. 7(a) is a schematic diagram illustrating the principle of forming a pattern on an object according to light reflected from a floor when the object is located spaced apart from a patterned light projection range and FIG. 7(b) shows an image acquired in the case of FIG. 7(a).

Figure 7:
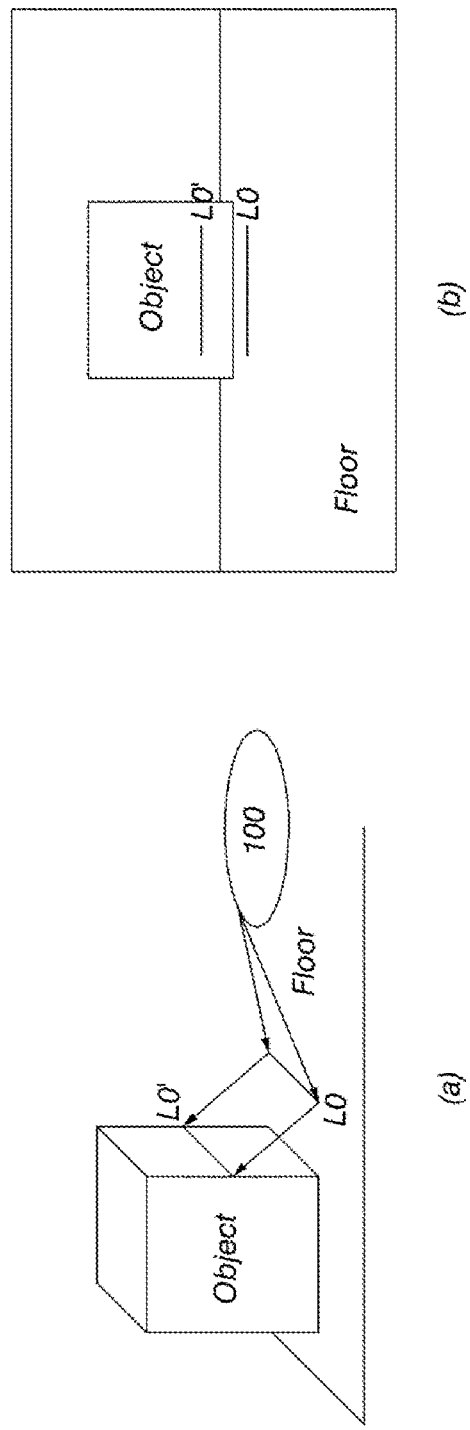
FIG. 7 is a schematic diagram illustrating the principle of forming a pattern on an object according to light reflected from a floor when the object is located spaced apart from a patterned light projection range as shown in (a) and (b) shows an image acquired in the case of (a)

When a pattern is detected at the reference position L0, the validity determination module 142 can determine a pattern detected from a region above or below the reference position L0 as a pattern L0' according to reflected light. The pattern L0' according to reflected light is formed on the surface of the object according to light reflected from the floor, as shown in FIG. 7. When the floor is flat, the valid pattern L0 and the pattern L0' according to the reflected light are vertically separated from each other and thus pixels constituting the valid pattern L0 and pixels constituting the pattern L0' may belong to the same column in the image sensor 121 (refer to FIG. 7(b)).

FIG. 8(a) is a schematic diagram illustrating the principle of forming a pattern on a floor according to light reflected from an object when the object is located within the patterned light projection range and FIG. 8(b) shows an image acquired in the case of FIG. 8(a). When patterns are respectively detected from a region above the reference position L0 and a region below the reference position L0 while a pattern is not detected at the reference position L0 in the acquired image, as shown in FIG. 8(b), the validity determination module 142 can recognize that the pattern L1 detected from the region above the reference position L0 is a valid pattern and the pattern L1' detected from the region below the reference position L0 is a pattern according to reflected light.

Validity check can be performed in this manner because light reflected from the surface of the object forms the pattern L1' according to reflected light on the floor, as shown in FIG. 8(a). In this case, as long as light is projected from the pattern projection unit 150 to the area in front of the robot cleaner 100 downward (α>0, refer to FIG. 9), the light reflected from the surface of the object is geometrically propagated toward the floor so as to form a pattern at a position closer to the robot cleaner 100 than the object, and thus the pattern L1' according to the reflected light appears below the reference position L0 in the acquired image.

FIG. 9(a) is a schematic diagram illustrating optical geometry wherein an image is formed by the image sensor 121 when the object is located within the projection range of the pattern projection unit 150, and FIG. 9(b) shows an image acquired in the case of FIG. 9(a). Here, O indicates the optical center of the image acquisition unit 120, the optical axis corresponds to the Y-direction, and the projection direction of the pattern projection unit 150 is at the angle α to the optical axis. A reverse image is formed on the image plane of the image sensor 121 according to light that has passed through the optical center O and the acquired image (b) is obtained by inverting the reverse image.

A location relation between features (e.g., a pattern and the boundary between the object and the floor) detected from the image plane is defined on the basis of distances measured on the image plane. Although the acquired image may have a different scale from the image formed on the image plane (which also belongs to the category of images acquired by the image acquisition unit 120), the two images are geometrically similar. Accordingly, the location relation between the features may be defined on the basis of distance values measured in the acquired image and the defined location relation can correspond to that defined on the basis of the image plane.

Referring to FIG. 9, validity check may include a step of detecting the boundary M between the object and the floor from the image plane (or acquired image) and estimating a position (referred to as a valid pattern estimation position L1 hereinafter) at which a valid pattern is detected from the image plane (or acquired image) on the basis of the location relation between the detected boundary M and the reference position L0, and a step of determining validity of patterns (including a pattern according to reflected light) detected from the image plane (or acquired image) on the basis of the valid pattern estimation position.

The following equation can be derived from FIG. 9(a) through geometric analysis.

$$\|a'-\text{ref}'\|:\|\text{ref}'-b'\|=h_1:h_2 \quad \text{[Equation 1]}$$

Here, a', ref' (corresponding to the reference position ref and indicated by L0 in FIG. 9(b)) and b' respectively represent the position of a valid pattern formed on the object, the position of a valid pattern formed on the floor when no object is present (that is, the reference position) and the boundary between the object and the floor. a', ref' and b' are represented on the basis of the origin O' indicated on the image plane, and it is assumed that the surface of the object to which light is projected is perpendicular to the floor.

Since ref is predetermined, a' can be obtained by the pattern detection module 141 and h1 and h2 are acquired from disposition of the pattern projection unit 150 and the image acquisition unit 120, b' can be represented by a relational expression among a', ref', h1 and h2. b' obtained in this manner is a position (referred to as a boundary estimation position hereinafter) estimated as the boundary between the object and the floor, and the boundary detection module 146 can select a boundary from features (e.g., L1, M and L1' in FIG. 9(b)) detected from the acquired image on the basis of the boundary estimation position. For example, the boundary detection module 146 can select a pattern detected at a position closest to b' as the boundary between the object and the floor from patterns detected by the pattern detection module 141. When the image is not distorted and correct values of h1 and h2 are obtained, the position of the boundary M between the object and the floor, shown in FIG. 9(b), corresponds to b' in FIG. 9(a).

Even if the pattern corresponding to the boundary M is not detected from the acquired image, the height of the object can be estimated from the relation between the boundary estimation position and the position L1 of the valid pattern. In this case, the height of the object is estimated to be higher than the position L1 of the valid pattern.

The obstacle information acquisition module 143 can acquire obstacle information on the basis of the boundary M selected by the boundary detection module 146. The obstacle information acquisition module 143 can not only estimate the distance between the robot cleaner 100 and the object on the basis of the relation between the reference position ref and the position of the valid pattern but also obtain more accurate obstacle information on the basis of the location of the boundary M. The movement control module 144 can control operation of the drive motor 139 such that the main body 110 avoids the object while moving on the basis of the obstacle information (e.g., the distance between the robot cleaner 100 and the object and the boundary M between the floor and the object) acquired through the obstacle information acquisition module 143 (refer to step S16).

Figure 10:
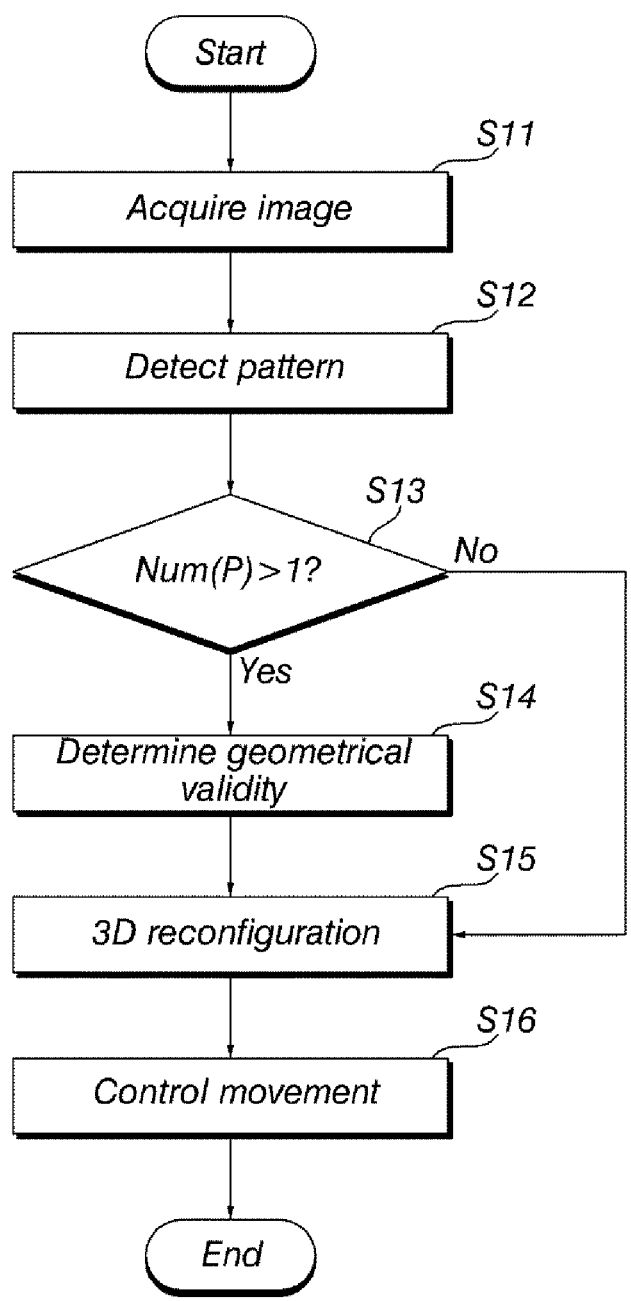
FIG. 10 is a flowchart illustrating a method for controlling the robot cleaner according to an embodiment of the present disclosure.

FIG. 10 is a flowchart illustrating a method for controlling the robot cleaner according to an embodiment of the present disclosure. An image of an area in front of the robot cleaner 100 may be acquired by the image acquisition unit 120 in step S11. A pattern may be detected from the image acquired in step S11 by the pattern detection module 141 in step S12.

Whether two or more patterns are detected may be determined by the pattern detection module 141 in step S13. When the pattern detection module 141 determines that two or more patterns are detected in step S13, geometrical validity determination may be performed in step S14. In the figure, Num(P) indicates the number of patterns P.

Figure 8:
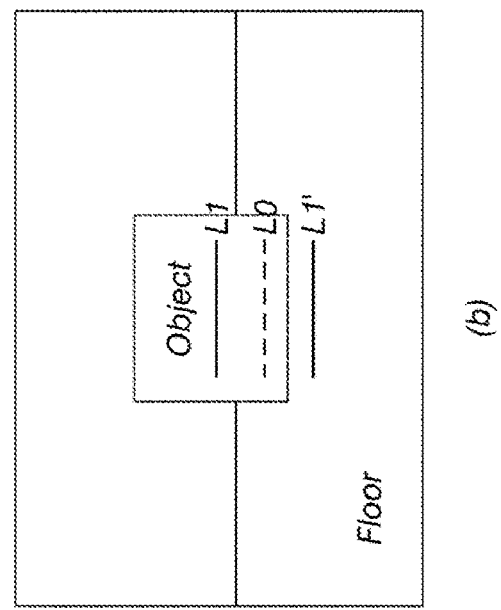
FIG. 8 is a schematic diagram illustrating the principle of forming a pattern on a floor according to light reflected from an object when the object is located within the patterned light projection range as shown in (a) and (b) shows an image acquired in the case of (a)
Figure 8:
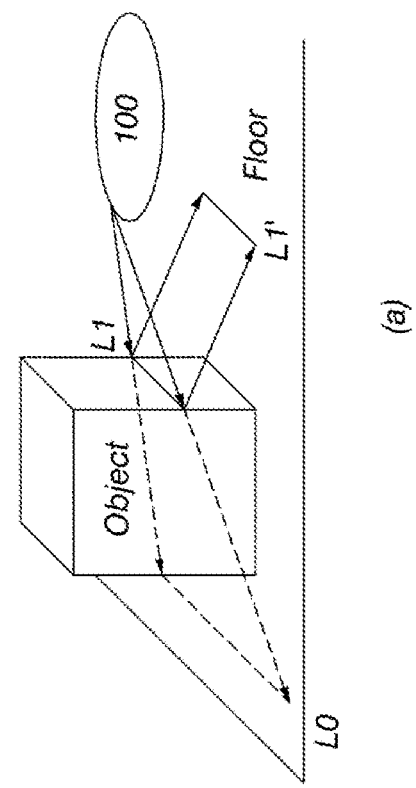

Validity check according to the embodiments aforementioned with reference to FIGS. 6 to 9 may be performed in step S14. More specifically, the validity determination module 143 may select valid patterns L0 and L1 according to location relation between patterns indicated in the acquired image, excluding the pattern L0' generated by light reflected from the floor, as shown in FIG. 7, and the pattern L1' generated by light reflected from the object, as shown in FIG. 8 or 9, in step S14.

In step S15, an obstacle situation around the robot cleaner 100 is three-dimensionally reconfigured on the basis of the valid patterns detected in step S14. Step S15 can be performed by the obstacle information acquisition module 143. Specifically, the distance between the robot cleaner 100 and the object can be obtained from a location relation between the valid pattern L1 and the reference position L0 and the obstacle situation around the robot cleaner 100 can be mapped on the basis of the obtained distance.

In step S16, movement of the robot cleaner 100 is controlled on the basis of obstacle information (e.g., the distance between the robot cleaner 100 and the object, a map obtained by mapping the distance, and the like) obtained in step S15. The movement control module 144 can control operation of the drive motor 139 such that the main body 110 of the robot cleaner 100 avoids the object during movement, in step S16.

Figure 11:
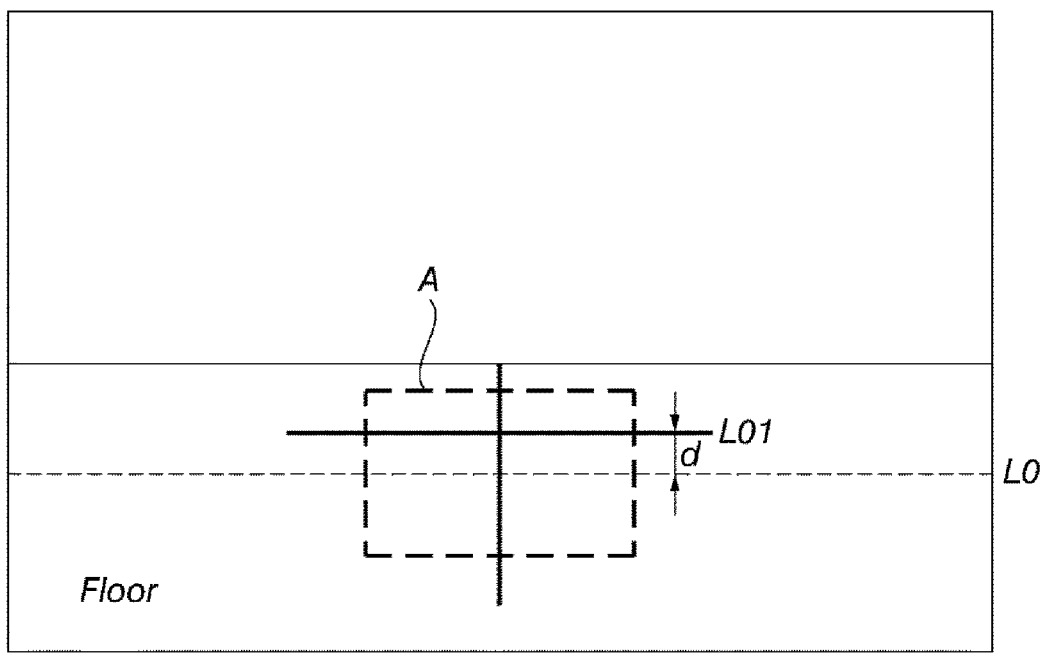
FIG. 11 shows an acquired image when an error is generated between a predetermined reference position and the position of a pattern generated by light projected to a floor.
Figure 12:
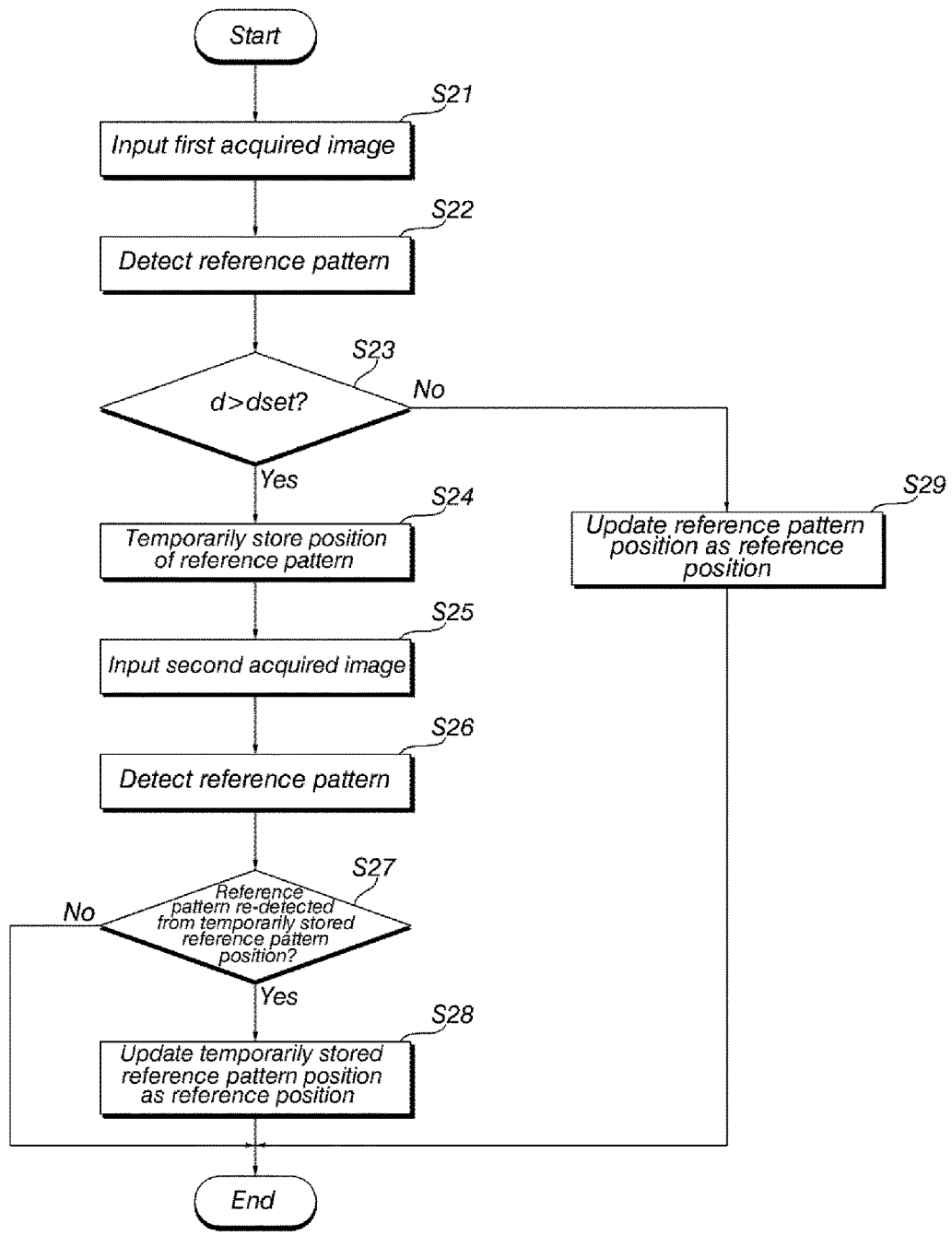
FIG. 12 is a flowchart illustrating a method for updating the reference position according to an embodiment of the present disclosure.

FIG. 11 shows an acquired image when an error is generated between the predetermined reference position and the position of a pattern generated according to light projected to the floor and FIG. 12 is a flowchart illustrating a method for updating the reference position according to an embodiment of the present disclosure. To achieve accurate validity check in the aforementioned embodiments, the reference position L0 needs to be correctly determined. Particularly, in the case of the robot cleaner 100 with a fixed projection direction of the pattern projection unit 150 and a fixed view of the image acquisition unit 120, the reference position L0 is set during the manufacturing process of the robot cleaner 1090 since the reference position L0 is geometrically determined.

However, the reference position L0 may be changed owing to various circumstances. In this case, the validity determination step S14 and the obstacle situation reconfiguration step S15 cannot be correctly performed. Accordingly, it is necessary to devise a method for controlling the robot cleaner, which is capable of updating the reference position L0. The method will now be described with reference to FIGS. 5, 11 and 12.

The pattern L01 shown in FIG. 11 is a pattern projected to the floor from the pattern projection unit 150. The pattern L01 is referred to as a reference pattern. The pattern detection module 141 may receive a first acquired image output from the image acquisition unit 120 (S21) and detect the reference pattern L01 from the first acquired image. The first acquired image is preferably obtained by projecting patterned light with the robot cleaner 100 placed on the flat floor.

When cross-shaped patterned light (refer to FIG. 1) is projected from the pattern projection unit 150, the pattern detection module 141 can detect a "+" shaped pattern (sufficiently smaller than the pattern formed by the patterned light) from a specific region around the predetermined reference position L0 and detect the reference pattern L01 by performing feature detection in the horizontal direction from the detected "+" shaped pattern. Normalized cross correlation using a feature mask having a cross shape may be used to detect a "+" shaped feature. However, the present disclosure is not limited thereto and various known feature detection algorithms can be used.

Considering that the patterned light projection range is fixed and the reference pattern is generated by light projected to the floor, a region in which the "+" shaped feature is detected in the acquired image is limited, and thus it is desirable to perform the aforementioned process of detecting the "+" shaped feature only on a specific area A which is expected to include the feature rather than performing the process on the entire acquired image in order to improve detection speed.

A reference position setting module 145 may compare the position of the reference pattern L01 detected in step S22 with the reference position L0 prestored in the storage unit 160 (S23). In this step, a distance d between the reference pattern L01 and the reference position L0 can be measured in the acquired image and the distance d is compared with a predetermined allowable distance dset.

When the distance d is less than the allowable distance dset in step S23, the position of the reference pattern L01 detected in step S22 is updated to a new reference position L0.

When the distance d is greater than the allowable distance dset in step S23, which means that the light projected to the floor forms a pattern at the reference position L0 (that is, a considerable error is present between the prestored reference position and the position of the current reference pattern), the position of the reference pattern L01 detected in step S22 is temporarily stored in the storage unit 160. In this case, it is necessary to check whether the reference pattern L01 is temporarily detected from the position for a special reason (e.g., uneven floor) because the reference pattern L01 is separated from the reference position L0 by longer than the allowable distance dset.

In step S25, the pattern detection module 141 receives a second acquired image obtained at a position different from that in step S21. The robot cleaner 100 is moved from the position at which the image is acquired in step S21 and then the second acquired image is obtained by the image acquisition unit. In step S26, the reference pattern L01 is detected from the second acquired image. Step S26 is substantially the same as step S22.

In step S27, it is determined whether the position of the reference pattern detected in step S26 is substantially the same as the position temporarily stored in step S24. When a difference between the position of the reference pattern detected in step S27 and the temporarily stored position is within a predetermined error range, the reference pattern detected in step S26 can be determined to be detected at the same position as the reference pattern detected in step S22. In this case, the predetermined reference position L0 can be updated to the temporarily stored position of the reference pattern.

Upon determining that the position of the reference pattern detected in step S26 differs from the position temporarily stored in step S24, in step S27, the reference position L0 can be maintained.

An operation unit 137 may include a predetermined input means through which a reference position update command is input. The method for controlling the robot cleaner according to steps S21 to S29 can be performed when the update command is input through the input means.

Therefore, the present disclosure has been made in view of the above problems, and it is an object of the present disclosure to provide a robot cleaner and a method for controlling the same which are capable of discriminating a pattern generated by light projected from a pattern projection unit from a pattern generated due to reflection of the light from a floor or an object, from among light patterns detected from an image.

According to an aspect of the present disclosure, a method for controlling a robot cleaner configured to project light of a predetermined pattern to a floor of an area in front thereof in a specific direction and to acquire an image of the area to which the light is projected, includes: (a) acquiring an image of area in front of the robot cleaner; (b) detecting the pattern from the image acquired in (a); and (c) discriminating a pattern formed by reflected light from a pattern formed by light directly projected from the robot cleaner, from among patterns indicated in the acquired image, on the basis of geometrical characteristics defined by a projection direction of the light and the direction of an optical axis in which the image is acquired when two or more patterns are detected from the image.

When the position of the pattern formed by the light directly projected to the floor is defined as a reference position in the acquired image, (c) may include selecting a pattern detected at the reference position as a valid pattern when one of the two or more patterns is detected at the reference position and at least one other pattern is detected from a region above the reference position.

When the position of the pattern formed by the light directly projected to the floor is defined as a reference position in the acquired image, the step (c) may comprise selecting a pattern detected from a region above the reference position as a valid pattern when patterns are respectively detected from the region above the reference position and a region below the reference position. The method may further include (d) obtaining a distance to an object on the basis of the valid pattern. In the step (d), the distance to the object may be obtained on the basis of a location relation between the reference position and the valid pattern in the acquired image. The step (d) may include determining that the distance to the object is shorter as the distance between the reference position and the valid pattern increases.

The method may further include (d) updating the reference position, wherein (d) include: (d-1) acquiring a front view image of the robot cleaner; (d-2) detecting a pattern formed by light directly projected to the floor from the robot cleaner from the image acquired in (d-1); (d-3) comparing a distance between the pattern detected in (d-2) and the reference position with a predetermined allowable distance; and (d-4) updating the reference position to the position of the pattern detected in (d-2) on the basis of a comparison result in (d-3). The step (d) may further include: (d-5) moving the robot cleaner upon determining that the distance obtained in (d-2) is greater than the allowable distance in (d-2); (d-6) acquiring a front view image of the robot cleaner at a changed position of the robot cleaner; (d-7) detecting a pattern formed by light directly projected to the floor from the robot cleaner from the image acquired in (d-6); (d-8) comparing the position of the pattern detected in (d-7) with the position of the pattern detected in (d-2); and (d-9) updating the reference position to the position f the pattern detected in (d-2) on the basis of a comparison result in (d-8). The step (d-9) may include updating the reference position to the position of the pattern detected in (d-2) when the position of the pattern detected in (d-7) is the same as the position of the pattern detected in (d-2).

The method may further include: when the position of the pattern formed by the light directly projected to the floor is defined as a reference position in the acquired image, (e) estimating a position at which the boundary between the object and the floor will be detected on the basis of the reference position and a position of a pattern generated by light directly projected to an object located in front of the robot cleaner; and (f) selecting a boundary from patterns detected in (b) on the basis of the position at which the boundary will be detected, estimated in (e). The step (f) may include selecting a pattern closest to the position at which the boundary will be detected, estimated in (e), from the patterns detected in (b).

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling a robot cleaner configured to project light of a predetermined pattern to a floor of an area in front of the robot cleaner in a specific direction and to acquire an image of the area to which the light is projected, comprising:
   (a) acquiring an image of an area in front of the robot cleaner;
   (b) detecting patterns from the acquired image; and
   (c) determining a first pattern and a second pattern from among the detected patterns, the first pattern formed by light directly projected from the robot cleaner, the second pattern formed after reflection of the first pattern, and discriminating the first pattern from the second pattern based on geometrical characteristics defined by a projection direction of the light and the direction of an optical axis in which the image is acquired,
   wherein, when a position of a third pattern formed by light directly projected to the floor is defined as a reference position in the acquired image, step (c) comprises selecting a pattern detected at the reference position as the first pattern when one of the two or more patterns is detected at the reference position and at least one other pattern is detected from a region above the reference position,
   wherein the method further comprises (d) updating the reference position,
   wherein step (d) comprises:
      (d-1) acquiring an image of an area in front of the robot cleaner;
      (d-2) detecting a fourth pattern formed by light directly projected to the floor from the robot cleaner from the image acquired in step (d-1);
      (d-3) comparing a distance between the fourth pattern and the reference position with a predetermined allowable distance; and
      (d-4) updating the reference position to a position of the fourth pattern based on a comparison result in step (d-3).

2. The method of claim 1, wherein, when a position of a third pattern formed by light directly projected to the floor is defined as a reference position in the acquired image, step (c) comprises selecting a pattern detected from a region above the reference position as the first pattern when patterns are respectively detected from the region above the reference position and a region below the reference position.

3. The method of claim 2, further comprising obtaining a distance to an object based on the first pattern.

4. The method of claim 3, wherein in the obtaining the distance to the object, the distance to the object is obtained based on a location relation between the reference position and the first pattern in the acquired image.

5. The method of claim 4, wherein the obtaining the distance to the object comprises determining that the distance to the object is shorter as the distance between the reference position and the first pattern increases.

6. The method of claim 1, wherein step (d) further comprises:
   (d-5) moving the robot cleaner upon determining that the distance obtained in step (d-2) is greater than the allowable distance in step (d-2);
   (d-6) acquiring an image of an area in front of the robot cleaner at a changed position of the robot cleaner;
   (d-7) detecting a fifth pattern formed by light directly projected to the floor from the robot cleaner from the image acquired in step (d-6);
   (d-8) comparing a position of the fifth pattern with a position of the fourth pattern detected in step (d-2); and
   (d-9) updating the reference position to the position of the fourth pattern on the basis of a comparison result in step (d-8).

7. The method of claim 6, wherein step (d-9) comprises updating the reference position to the position of the fourth pattern when the position of the fifth pattern is the same as the position of the fourth pattern.

8. The method of claim 1, wherein when a position of third pattern formed by the light directly projected to the floor is defined as a reference position in the acquired image,
   (e) estimating a fourth position at which the boundary between the object and the floor will be detected on the basis of the reference position and a position of fourth pattern generated by light directly projected to an object located in front of the robot cleaner; and
   (f) selecting a boundary from patterns detected in step (b) on the basis of the fourth position.

9. The method of claim 8, wherein step (f) comprises selecting a pattern closest to the fourth position from the patterns detected in step (b).

10. A method for controlling a robot cleaner configured to project light in front of the robot cleaner in a specific direction and to acquire an image of the area to which the light is projected, comprising:
    acquiring an image of an area in front of the robot cleaner;
    detecting patterns from the acquired image; and
    determining a first pattern and a second pattern from among the detected patterns, wherein the first pattern being provided by light from the robot cleaner, and the second pattern provided after reflection of the first pattern, and discriminating the first pattern from the second pattern based on geometrical characteristics defined by a projection direction of the light and the direction of an optical axis in which the image is acquired when two or more patterns are detected from the image,
    wherein when a position of a third pattern formed by light projected to a floor is defined as a reference position in the acquired image, the discriminating of the first pattern from the second pattern includes selecting a pattern detected at the reference position as the first pattern when one of the two or more patterns is detected at the reference position and at least one other pattern is detected from a region above the reference position,
    wherein the method further comprises updating the reference position, wherein the updating of the reference position includes:
       acquiring an image of an area in front of the robot cleaner;
       detecting a fourth pattern formed by light projected to a floor from the robot cleaner from the acquired image;
       comparing a distance between the fourth pattern and the reference position with a predetermined allowable distance; and
       updating the reference position to a position of the fourth pattern based on a result of the comparing.

11. The method of claim 10, wherein when a position of a third pattern formed by light projected to a floor is defined as a reference position in the acquired image, the discriminating of the first pattern from the second pattern includes selecting a pattern detected from a region above the reference position as the first pattern when patterns are respectively detected from the region above the reference position and a region below the reference position.

12. The method of claim 11, comprising obtaining a distance to an object based on the first pattern.

13. The method of claim 12, wherein the distance to the object is obtained based on a location relation between the reference position and the first pattern in the acquired image.

14. The method of claim 13, wherein the obtaining of the distance to the object includes determining that the distance to the object is shorter as the distance between the reference position and the first pattern increases.

* * * * *